( 12 ) United States Patent
Kiennemann et al.

(10) Patent No.: US 9,221,033 B2
(45) Date of Patent: Dec. 29, 2015

(54) CATALYST FOR REFORMING TAR USED IN THE STEAM GASIFICATION OF BIOMASS

(75) Inventors: Alain Kiennemann, Illkirch-Graffenstaden (FR); Claire Courson, Kienheim (FR); Mirella Virginie, Strasbourg (FR)

(73) Assignees: CENTRE NATIONAL DE LA RECHERCHE SCIENTIFIQUE (C.N.R.S.), Paris (FR); UNIVERSITE DE STRASBOURG, Strasbourg (FR)

( * ) Notice: Subject to any disclaimer, the term of this patent is extended or adjusted under 35 U.S.C. 154(b) by 1068 days.

(21) Appl. No.: 13/321,534

(22) PCT Filed: May 19, 2010

(86) PCT No.: PCT/FR2010/050962
§ 371 (c)(1),
(2), (4) Date: Dec. 21, 2011

(87) PCT Pub. No.: WO2010/133801
PCT Pub. Date: Nov. 25, 2010

(65) Prior Publication Data
US 2012/0079768 A1 Apr. 5, 2012

(30) Foreign Application Priority Data
May 20, 2009 (FR) ...................................... 09 53376

(51) Int. Cl.
| | |
|---|---|
| B01J 23/58 | (2006.01) |
| B01J 23/745 | (2006.01) |
| B01J 37/02 | (2006.01) |
| B01J 37/08 | (2006.01) |
| C01B 3/40 | (2006.01) |
| C01B 3/58 | (2006.01) |
| C10J 3/48 | (2006.01) |
| C10J 3/84 | (2006.01) |
| C10K 3/02 | (2006.01) |
| B01J 35/02 | (2006.01) |

(52) U.S. Cl.
CPC ............ *B01J 23/745* (2013.01); *B01J 37/0201* (2013.01); *B01J 37/08* (2013.01); *C01B 3/40* (2013.01); *C01B 3/58* (2013.01); *C10J 3/482* (2013.01); *C10J 3/84* (2013.01); *C10K 3/023* (2013.01); *B01J 35/023* (2013.01); *C01B 2203/0233* (2013.01); *C01B 2203/048* (2013.01); *C01B 2203/0435* (2013.01); *C01B 2203/1047* (2013.01); *C01B 2203/1247* (2013.01); *C01B 2203/84* (2013.01); *C10J 2300/0916* (2013.01)

(58) Field of Classification Search
CPC ...... B01J 23/745; B01J 37/08; B01J 37/0201; B01J 35/023; C10K 3/023; C10J 3/84; C10J 3/482; C01B 3/58; C01B 3/40; C01B 2203/84; C01B 2203/1047; C01B 2203/0435; C01B 2203/1247; C01B 2203/0233; C01B 2203/048
USPC ..................................... 502/328, 252; 48/204
See application file for complete search history.

(56) References Cited

FOREIGN PATENT DOCUMENTS

| | | |
|---|---|---|
| JP | 63-185455 A | 8/1988 |
| JP | 2005-161134 A | 6/2005 |
| JP | 2009-50847 A | 3/2009 |
| WO | 01/89687 A | 11/2001 |
| WO | WO 01/89687 A1 | 11/2001 |

OTHER PUBLICATIONS

Devi et al, "Olivine as tar removal catalyst for biomass gasifiers: Catalyst characterization," Applied Catalysis A: General, 2005, pp. 68-79, vol. 294.
Rapagna et al, "Steam-gasification of Biomass in a Fluidised-bed of Olivine Particles," Biomass & Bioenergy, 2000, pp. 187-197, vol. 19.
Uddin et al, "Catalytic Decomposition of Biomass Tars With Iron Oxide Catalysts," Fuel, 2008, pp. 451-459, vol. 87.
Azhar Uddin et al., "Catalytic decomposition of biomass tars with iron oxide catalysts", Fuel, IPC Science and Technology Press; Guildford, GB; vol. 87, No. 4-5, Dec. 15, 2007, pp. 451-459.
Devi L. et al., "Olivine as tar removal catalyst for biomass gasifiers: Catalyst characterization", Applied Catalysis A: General, Elsevier Science; Amsterdam, NL; vol. 294, No. 1, Oct. 4, 2005, pp. 68-79.
International Search Report dated Oct. 22, 2010 issued for PCT/FR2010/050962.

*Primary Examiner* — Colleen Dunn
*Assistant Examiner* — Haytham Soliman
(74) *Attorney, Agent, or Firm* — Knobbe, Martens, Olsen & Bear, LLP

(57) ABSTRACT

A catalyst includes an olivine substrate on which an iron compound layer is deposited, produced by impregnating the olivine substrate with a solution including an iron salt, and then heat-treating. The catalyst is useful for steam-reforming tar, in particular in gaseous media from the steam gasification of biomass. Further, the catalyst can be used alone for catalyzing the steam gasification of organic compounds from biomass while limiting the amount of tar produced in the synthesized gases.

30 Claims, No Drawings

CATALYST FOR REFORMING TAR USED IN THE STEAM GASIFICATION OF BIOMASS

RELATED APPLICATIONS

This application is a U.S. National Phase of International Application No.: PCT/FR2010/050962, filed May 19, 2010, designating the U.S., and published in French as WO 2010/133801 on Nov. 25, 2010 which claims the benefit of French Patent Application No. 0953376 filed May 20, 2009.

FIELD OF THE INVENTION

The present invention relates to the field of heterogeneous catalysis. It more specifically concerns a catalytic system of supported catalyst type useful for performing the steam reforming of tar, and which proves to be particularly advantageous for performing gasification processes of organic compounds in particular for steam gasification processes of biomass.

BACKGROUND OF THE INVENTION

The organic compounds derived from biomass (e.g. wood) have long been used as fuel, mainly for heating. Owing to its relatively low calorific property, this scarcely profitable use has been superseded more recently by another conversion of better advantage, namely gasification which consists of converting organic compounds to useable gases, particularly as gas fuel for example in fuel cells or as basic gas constituents for the synthesis of chemical compounds.

The gasification of compounds derived from biomass typically entails steam gasification in which the compounds it is desired to convert are placed in the presence of steam and a suitable catalyst, at relatively high temperatures. Following a complex thermo-chemical process this results in the conversion of organic compounds to a gas mixture (called syngas) which chiefly contains hydrogen, carbon monoxide and/or carbon dioxide, and methane. Among the thermo-chemical conversion processes currently used, fluidized bed gasification with steam allows the obtaining of optimized yields of gas products (hydrogen in particular) by means of the high heating temperatures involved, whilst proposing advantageous residence times and a reduction in the quantities of residues produced with, in addition, a high calorific power of the gas produced (higher than with gasification processes in air which lead to nitrogen-diluted gases).

A recurrent problem which arises with these gas mixtures derived from steam gasification processes of organic compounds is that the steam gasification processes of organic compounds are accompanied by the formation of undesirable by-products likely to pollute the syngases. In particular, notably on account of the high temperatures involved, the steam gasification reactions often give rise to tars.

The term <<tar>> in the meaning of the present description is meant to designate an aromatic compound having a higher molecular weight than benzene (for example toluene or the naphtalenes), or else a mixture comprising said aromatic compounds. The tars which are obtained with a steam gasification process typically include compounds comprising 1 to 5 aromatic cores, whether or not oxygenated.

The presence of the said tars in the gases derived from steam gasification makes these gases unfit for some industrial applications, for example in gas turbines or fuel cells. The tars effectively tend to condense into complex structures liable to clog these devices. This disadvantage is a major obstacle to the economic viability of biomass steam gasification processes.

More generally, the generation of tars during steam gasification raises another problem, namely that the tars produced are liable to poison the catalyst used to carry out gasification, since the tars tend to deposit on the surface of the catalyst and consequently to cause its gradual de-activation.

Different methods have been proposed for removing these tars, either downstream of the gasification process (so-called secondary removal methods) or directly in the reactor in which these tars are formed (so-called primary methods which allow the inhibiting of tar formation and/or the conversion of the formed tars within the reactor) which do not always prove to be satisfactory.

Among the secondary methods, chemical methods have been envisaged (in particular thermal cracking) or mechanical methods (filters, cyclones, centrifuges, scrubbers) which although efficient in reducing the tar content of gases derived from biomass steam gasification processes, prove to be costly particularly in terms of energy consumption (for cracking in particular) or in treatment terms (with regard to cracking filters or scrubbers in particular).

Concerning the primary methods, in an attempt to remove tars or to inhibit their formation at source, it has been envisaged to add different types of catalysts to steam gasification reactors, which in practice have proved to be more or less efficient. The proposed catalysts are generally intended to achieve catalytic reduction of tars using reforming reactions consisting of converting the tars in the presence of water and/or $CO_2$ to a gas mixture notably comprising hydrogen, CO and/or $CO_2$, typically in accordance with one and/or the other of the following reactions (in which $C_nH_m$ represents a tar):

$$C_nH_m + nH_2O \rightarrow nCO + (n+m/2)H_2$$

$$C_nH_m + nCO_2 \rightarrow 2nCO + m/2 H_2$$

Within this context it has been proposed, as catalyst, to use sand, dolomites and calcined magnesites, or even olivines and zeolites, and catalysts based on metal compounds (supported nickel oxides in particular). The results obtained are more or less conclusive with catalytic efficacies possibly varying to a large extent including for catalysts with close compositions. In this respect, it is to be noted that the reactions which take place within the gasification reactor are ill understood and that the choice of suitable catalyst is therefore made empirically. The mechanisms involved are insufficiently understood at the present time making it impossible to predict beforehand whether a catalyst will or will not be efficient before it is actually tested.

Among the proposed catalysts, the dolomites (magnesium and calcium carbonates) need to be calcined to oxide form, which leads to loss of specific surface area and brittleness which generate phenomena of catalyst attrition (gradual crumbling of the catalyst) and lead to the undesired formation of fine particles in the gas effluent which makes the use of dolomites difficult, in particular in fluidized bed reactors notably at industrial level.

Olivines (mixed silicates of magnesium and iron typically meeting the formula $(Mg_{1-x}Fe_x)_2SiO_4$ where x is a nonzero number and generally of the order of 0.1) are more resistant to attrition. Although they have some activity in the destruction of tars (similar to that of calcined dolomites) they nevertheless prove to be insufficiently efficient for the envisaging of their use on an industrial scale.

Concerning the catalysts based on metal compounds, different catalysts have been tested in reactions of biomass steam gasification type. In this respect, nickel catalysts have especially been developed of which some have proved to allow relatively efficient tar reforming, in particular at applied temperatures of higher than 740° C., with substantial removing of tars, to a greater extent than with the above-mentioned olivines and calcined dolomites. For example nickel-bases catalysts supported on alumina have particularly been described (in *Ind. Eng. Chem. Res.*, vol. 36, p 1335 (1997), for example) or more recently, in application FR 2 809 030, catalysts which comprise a nickel-based active phase deposited on an olivine substrate which have given excellent results for the steam reforming of tars.

Nonetheless, despite these advantages, nickel-based catalysts have the drawback of being subject to phenomena of attrition, in particular when used in fluidized bed reactors. In addition to a loss of catalytic efficacy over time, these phenomena of attrition lead to non-negligible pollution of the gases produced by the nickel, which is unacceptable at industrial level having regard to the toxicity of nickel.

In addition, nickel catalysts tend to become deactivated when in contact with compounds such as sulfur-containing compounds which are often obtained during the steam gasification of biomass. The nickel in oxidation state 0 which forms on the surface of nickel catalysts also proves to be a coke precursor likely to lead to the formation of carbon aggregates (cokes) which may poison the catalyst. Also, nickel-based catalysts require recycling after their use, which proves to be particularly costly.

SUMMARY OF THE INVENTION

It is one objective of the present invention to provide a novel catalytic system which is suitable for catalyzing the steam reforming of tars, in particular the steam reforming of tars formed during the steam gasification of organic compounds derived from biomass in particular, with efficacy similar to that of the above-mentioned nickel catalysts in terms of tar conversion to hydrogen, but by overcoming the problems encountered with nickel catalysts, particularly in terms of toxicity and cost.

DETAILED DESCRIPTION OF THE EMBODIMENTS

For this purpose, the present invention proposes using a specific catalyst, of supported type, which comprises an iron compound on an olivine-based substrate.

More precisely, the subject of the present invention is a catalyst which comprises an olivine-based substrate on which a layer is deposited containing an iron compound which can be obtained by impregnating the olivine substrate with a solution comprising an iron salt, followed by heat treatment (generally in air) of the impregnated substrate, at a temperature of between 400 and 1,400° C., preferably between 600 and 1,400° C. advantageously after prior drying performed after the impregnation, and wherein the iron content deposited on the substrate, expressed as the weight of added elementary iron relative to the total weight of the catalyst, is at least 5%.

With the present invention, the inventors have now evidenced that this specific catalyst containing iron deposited on olivine proves to be particularly efficient in the steam reforming of tars, in particular in gases derived from the steam gasification process of organic compounds particularly those originating from biomass. In concrete terms, a catalyst of the invention allows major tar conversion to be obtained, generally greater than 60%, even more than 80% and possibly reaching 90% or over, which typically allows the tar content to be reduced by a factor of at least 10 in the gases derived from gasification. In addition, the catalysts of the invention lead to a high yield of hydrogen. This catalytic efficacy is maintained in the presence of the gases generated during steam gasification of biomass, in particular in the presence of $CO$, $CO_2$, $H_2$ and $CH_4$. In addition, the catalyst remains active at high temperature and notably allows steam reforming reactions to be conducted at temperatures ranging from 700 to 900° C.

It is to be pointed out, that these results prove to be unexpected in the light of currently available data on the few catalysts containing iron compounds which have been envisaged and tested for the steam gasification of biomass and which, in general, have not shown any particularly efficient activity in the treatment of tars. On the contrary, the articles on iron-based catalysts rather more tend to lead to assuming that a deposit of iron on a substrate does not lead to results of interest for the steam reforming of tars.

For example, catalysts have been described in *Catalysis Today*, vol 27, pp. 55-62 (1996), allowing the removal of tars in gases derived from the gasification of biomass. The use of iron has been envisaged in this respect but did not lead to an improvement in tar conversion. In particular, a dolomite was tested in this document and an iron-containing dolomite which led to identical results.

Similarly, in *Fuel*, vol. 87, pp 451-459 (2008), an alumina carrying a deposit of $Fe_2O_3$ was tested for the catalytic gasification of cedar wood, which here again led to similar results to those obtained with alumina alone.

Therefore it comes to light that, against all expectations, the specific iron-based catalysts developed under the invention, allow results to be obtained that are at least similar to the results obtained with the above-mentioned nickel catalysts. In addition, the inventors have now evidenced that the catalytic properties of the catalysts according to the invention are remarkably stable over time, which allows advantageous use of these catalysts both on laboratory scale and on industrial scale.

Under the work conducted by the inventors for the invention, it was also possible to establish that with a catalyst according to the invention it is possible to integrate a large quantity of iron in the layer deposited on the olivine (typically from 10 to 20% by weight relative to the total weight of the catalyst, even higher) and that more generally the near-entirety of the iron added to the olivine is available for catalyzing the reforming reaction, which allows a catalyst to be obtained having particularly strong activity.

Additionally, the depositing of the layer on the olivine, by impregnation, drying and calcining, imparts a specific surface area to the final catalyst that is greater than that of the starting olivine substrate (generally of the order of 10 $m^2/g$ for the final catalyst against less than 1 $m^2/g$ for the starting olivine), which increases the available exchange surface area between the tars and the catalyst, further increasing the efficacy thereof.

Also, contrary to nickel catalysts, the catalysts of the invention do not comprise any toxic compounds, and they therefore allow gases to be obtained derived from the steam gasification of biomass that are free of toxic compounds, and which do not therefore need to be treated before use, and are without danger for operators other than the danger related to the use of hydrogen and CO.

In addition, having regard to the presence of iron compounds in the catalysts of the invention, these prove to be capable of reducing the content of some compounds usually present in gases derived from the steam gasification of organic compounds. In particular, the use of a catalyst of the invention in the reaction medium, or downstream of a biomass steam gasification reaction, allows the avoiding of at least part of the sulfur-containing compounds (particularly $H_2S$) and ammonium $NH_3$ which are frequently formed in biomass steam gasification processes in which at least part of the treated organic compounds often contain atoms of nitrogen or sulfur.

It is also to be noted that the catalyst of the invention which uses olivine, one of the most abundant minerals in the earth's crust, and iron which is also largely available, is a catalyst that is heedful of the environment and low-cost.

Having regard to these different advantages, the catalysts of the invention provide a most interesting alternative to nickel catalysts of which they share the advantages without having the disadvantages thereof (it is to be noted in particular in this respect that the catalysts of the invention, contrary to nickel catalysts, do not require the cumbersome step of re-treating the catalyst after it has been used).

Additionally, having regard to the fact that they specifically comprise olivine, the catalysts of the invention can be used as catalyst for the steam gasification of organic compounds in particular those derived from biomass. In this case, the catalyst plays two roles, namely (1°) it ensures the steam gasification of organic compounds; and (2°) it ensures efficient destruction of the tars formed during this steam gasification. In this respect, the low attrition tendency of olivine, combined with fact that the catalyst does not contain any toxic compounds, allows the use of the catalysts of the invention for the steam gasification of organic compounds in processes in which the catalyst is used in the form of a fluidized bed. Alternatively, the catalysts of the invention may however be used in the form of fixed beds.

When used for the reforming of tars present in media derived from steam gasification processes of biomass, the catalysts of the invention lead to purified gases which are well adapted both as gas fuel and as basic gas constituent for the synthesis of chemical compounds. As a general rule, the gases thus obtained are sufficiently purified so that they can be used as such in some applications, and these gases also have a tar content that is sufficiently low so that they can be filtered through membrane catalytic filters for the substantial ridding of any tar (the tar content in the gases obtained is generally lower than the tolerance threshold of the filters), which allows particularly purified gases to be obtained that can be used as fuel at the anode of a fuel cell, in particular of SOFC type; or as fuel in a gas turbine for the production of heat and/or electricity.

A catalyst of the invention specifically comprises an olivine-based substrate on which an iron-containing layer is deposited.

By <<olivine-based substrate>>, is meant a substrate formed in whole or in part of olivine, the substrate advantageously comprising at least 50% by weight, preferably at least 80% by weight of olivine relative to the total weight of the substrate, this substrate preferably being substantially formed of olivine (preferably to the proportion of at least 90%, even at least 95% and further preferably at least 98% by weight relative to the total weight of the substrate).

The olivine used as substrate in a catalyst of the invention is a material of well-known type. It is a mixed silicate of magnesium and iron in which the magnesium and iron cations are included in tetrahedral silica. The olivine of the substrate present in the catalyst of the invention advantageously meets the formula $(Mg_{1-x} Fe_x)_2SiO_4$ where x is a nonzero number generally less than 1, most often between 0.01 and 0.5, for example less than 0.25 (x generally being between 0.05 and 0.15, for example of the order of 0.08 to 0.12), and which may comprise additional elements as traces (typically to the proportion of 1%, preferably less than 0.5%) such as Ca, Cr, Ni or Al, or even free iron (namely iron not included in the structure of the silicate).

Preferably, as substrate in the catalyst of the invention, a natural olivine is used which may for example, by way of indication, originate from natural olivine mines located in Austria or Italy. In particular, a natural olivine well adapted for use in the present invention is the olivine marketed by Magnolithe GmbH (Austria).

According to one preferred embodiment, the olivine used in the catalyst of the present invention is an olivine meeting formula $(Mg_{1-x}Fe_x)_2SiO_4$ where x is between 0.05 and 0.15 preferably between 0.08 and 0.12.

Preferably, irrespective of its exact formula, the olivine used as substrate in the catalyst of the invention comprises in weight relative to the total weight of the olivine: between 28% and 35% Mg;
between 1% and 10% Fe;
between 18% and 22% Si;
optionally up to 0.5% Ni;
optionally up to 0.5% Ca;
optionally up to 0.5% Al; and
optionally up to 0.5% Cr.

One olivine particularly well adapted for implementing the invention has a content by weight, relative to the total weight of the olivine, of: 30.5% Mg; 7.1% Fe; 19.6% Si; 0.20% Ca; 0.07% Al; and 0.08% Cr.

The olivine used as substrate according to the invention is preferably an olivine previously subjected to heat treatment of calcining type, advantageously at a temperature of more than 1,000° C., and more preferably at a temperature higher than 1,200° C., typically between 1,500 and 1,700° C.

Also, it is preferable to use as substrate according to the invention an olivine in divided form. Advantageously, the olivine-based substrate present in the catalyst of the invention is in the form of a powder (typically obtained by grinding natural olivine) having a mean particle size of between 100 µm and 750 µm, preferably between 250 and 600 µm, for example between 350 and 500 µm (typically of the order of 425 µm). The catalyst comprising a said substrate generally has a similar particle size (and generally identical).

A catalyst according to the invention is obtained by depositing an iron compound on the above-mentioned substrate.

In a catalyst of the invention, the content of iron deposited on the support, expressed on the basis of the weight of deposited elementary iron relative to the total weight of the catalyst is at least 5%. Results of particular interest are obtained with contents of 10% or more, for example between 10 and 20%. In general, it is not required that the iron content deposited on the substrate should be more than 20% to obtain good tar conversion, but higher contents (for example ranging up to 25 even up to 30%) are not excluded by the present invention.

In the catalyst of the invention, the iron is added to the surface of the substrate by impregnation with an iron salt solution followed by heat treatment, generally in air, or more generally in an oxidizing atmosphere allowing iron-based species to be fixed to the surface of the substrate which have strong interaction with the iron present in the olivine.

Typically, a catalyst which can be used in the present invention is obtained by implementing a method comprising the following steps:

(A) an olivine-based substrate, preferably of the above-mentioned type (and advantageously previously heat treated at a temperature of at least 1,000° C., for example between 1,500 and 1,700° C.), is impregnated with a solution containing an iron salt; then (B) the impregnated solid obtained after step (A) is dried, then (C) the dried solid is heat treated, preferably in air, at a temperature of 400 to 1,400° C., preferably at a temperature of 600 to 1,400° C.

This preparation method, according to another aspect, forms another specific subject of the present invention.

The impregnation and drying at steps (A) and (B) can be carried out using any means known per se. Typically, the olivine is impregnated by contacting thereof, preferably in the divided state, with the iron salt solution (generally by forming a dispersion of the olivine in the solution) after which the mixture obtained is evaporated, generally for 5 to 20 hours (typically of the order of 10 hours to 15 hours) at a temperature generally between 50 and 150° C. (for example under reflux of the solvent, typically in a rotary evaporator).

The iron salt solution used at step (A) is preferably an aqueous solution. More generally, it may be a solution in a polar solvent (e.g. ethanol or a water/ethanol mixture).

The iron salt used at step (A) may be a ferric salt, a ferrous salt or a mixture of several ferrous and/or ferric salts. The salt used may in particular be a nitrate, a chloride or an acetate, nitrates generally being well adapted, in particular having regard to their good solubility and reduced cost. Typically, the iron salt used at step (A) is a ferric nitrate, a ferrous nitrate, a ferric chloride, a ferrous chloride, a ferric acetate, a ferrous acetate, or a mixture of two or more of these salts. According to one embodiment of interest, the iron salt used to prepare the catalyst of the invention is ferric nitrate of formula $Fe(NO_3)_3$ The concentration of the solution used at step (A) is calculated in relation to the quantity of iron it is desired to deposit on the surface of the catalyst. In general, the near-entirety of the iron salt added to the solution comes to be deposited on the olivine after steps (A) and (B), the quantity of iron salt to be added to the solution used at step (A) then being calculated directly in relation to the desired Fe/olivine ratio in the final catalyst.

The heat treatment step applied to prepare the catalyst of the invention, in particular at above-mentioned step (C), allows binding of the deposited iron with the olivine. For this purpose, it is preferably conducted in air. Preferably, the heat treatment is conducted at a temperature of 600° C. or higher, more preferably higher than 700° C. and further preferably higher than 850° C. However, as shown by analyses of temperature-programmed reduction (TPR) of the catalyst, it is preferable that the heat treatment should not be conducted at too high a temperature otherwise the strong interactions between the iron and the olivine would be too strong making part of the iron added unusable for the tar reforming reaction, which will reduce the efficacy of the catalyst for tar reforming. On this account, the temperature of the heat treatment applied for preparing the catalyst of the invention, in particular at step (C), is preferably lower than 1,400° C., and more advantageously lower than 1,200° C. Therefore, typically, it is of advantage to conduct this heat treatment step at a temperature of between 900 and 1,100° C.

Typically, in order to achieve good conversion of the deposited iron salt, and optimal binding of the iron-based species with the olivine, the heat treatment at step (C) is conducted by leaving the dried solid obtained after step (B) at the above-mentioned temperature for a time of 2 to 10 hours.

X-ray diffraction analysis (XRD) of a catalyst according to the invention shows that the structure of the olivine is maintained in the catalyst obtained after step (C), irrespective of the impregnated amount of iron deposited on the surface of this catalyst.

In addition, analysis by X-ray photoelectronic spectroscopy (XPS) and Mössbauer spectroscopy show that the catalyst of the invention essentially comprises iron in oxidation state II and III, iron (II) being present within the olivine and iron (III) being located on the surface and at the olivine grain boundaries in the form iron (III) oxide ($Fe_2O_3$) or in a Fe—Mg spinel phase, the quantity of iron (III) available on the surface increasing with the temperature of the heat treatment at step (C). This specific structure of the catalyst proves to be of particular interest insofar as, without wishing to be bound by any particular theory, it appears to be possible to suggest in the light of the work carried out by the inventors, that it is the presence of iron located on the surface and at the grain boundaries (iron oxide) that is responsible for the activity of the catalyst in the reforming of tars. This iron (III) oxide probably undergoes point reduction to Fe II or $Fe^0$ species when it is contacted with the steam and gases produced in the medium by the catalytic reforming of tars, these metal species probably being the true active species in the catalysis of tar reforming, whereas the iron (II) present inside the olivine structure appears to be inactive.

Analyses of the catalysts of the invention by Mössbauer spectroscopy also indicate that the quantity of iron in oxidation state +II within the olivine, decreases when the temperature of the heat treatment at step (C) is increased, this iron in oxidation state +II (not available for reforming) being oxidized to reducible Fe III.

Irrespective of the exact mode of preparation thereof, a catalyst of the invention may advantageously be used to carry out steam reforming of tars present in a gaseous medium, in the presence of steam, so as to convert these tars to a gaseous mixture comprising hydrogen and to CO and/or $CO_2$. The catalysts of the invention in this respect show activity that is similar to that of nickel-based catalysts supported on olivine, as described for example in application FR 2 809 030, and is much higher than that of olivine used alone.

According to a further specific aspect, one subject of the present invention concerns this use of the catalysts of the invention, and more specifically a method for the steam reforming of tars present in a gaseous medium wherein the tars are contacted with a catalyst of the invention in the presence of steam.

In this method, preferably the contacting of the tars with the catalysts is also performed in the presence of hydrogen. In this case, the catalyst is contacted with the tars in the presence of steam and hydrogen, preferably with a molar ratio $H_2/H_2O$ greater than 1:1 otherwise a phenomenon of catalyst deactivation may be observed over time. However, this $H_2/H_2O$ molar ratio preferably remains below 2:1 otherwise the hydrogen present in too great quantity will tend to adversely affect the reforming reaction, thereby leading to a reduction in tar conversion and to a reduced hydrogen yield.

The efficacy of the conversion of tars to hydrogen in a steam reforming process using a catalyst according to the invention, as a general rule, is higher the longer the contact time between the catalyst and the tars.

Also, a steam reforming reaction using a catalyst of the invention is advantageously conducted at a temperature higher than 700° C. (more advantageously of at least 750° C. and further preferably of at least 775° C.) preferably at a temperature of between 700 and 900° C., more preferably between 750 and 850° C., for example between 800 and 850° C., (typically in the region of 825° C.).

According to one embodiment of particular interest, the method for the steam reforming of tars according to the invention can be applied for the treatment, as tar-containing gas medium, of a medium obtained by steam gasification of organic compounds particularly those derived from biomass. In this type of application, the catalyst proves not only to be useful for reforming tars, but also in some cases allows the trapping of other pollutants present in the medium such as sulfur-containing compounds of $H_2S$ type or ammonia.

As indicated above in the present description, a catalyst of the invention has the advantage of being active both for carrying out the reforming of tars and for the steam gasification of compounds derived from biomass. Therefore, the catalyst can advantageously be used as single catalyst for the conducting of steam gasification of an organic compound from biomass and for the conversion at the same time of all or part of the tars formed during this reaction.

In this respect, a catalyst of the invention has the advantage of being active in the so-called gas to water conversion reaction, as per the following reaction scheme:

$$CO+H_2O \rightarrow CO_2+H_2$$

which allows a further increase in the production of hydrogen through the conversion of the CO produced during steam gasification. The catalyst of the present invention thereby particularly differs from nickel catalysts which are inoperative for the reaction of gas to water conversion.

According to another specific aspect, one subject of the present invention is a method for the steam gasification of an organic compound derived from biomass, which places in contact the said organic compound, steam and a catalyst of the invention.

In the above-mentioned steam gasification and steam reforming methods, which use the catalyst of the invention, this catalyst may advantageously be used in the form of a fluidized bed or a circulating fluidized bed. Alternatively, it can also be used in the form of a fixed bed, although this embodiment generally proves to be of less advantage.

Also, the steam gasification and steam reforming methods using the catalysts of the invention have the non-negligible advantage of not requiring any prior activation of the catalyst which is used as such in the reaction under consideration. The work by the inventors allowed the evidencing in this respect that there is no need to proceed with prior reduction of the catalyst, the activity of the catalyst in the tar reforming reaction and the hydrogen yield in this reaction generally remaining unchanged whether or not pre-reduction takes place. This non-necessity to carry out preliminary activation of the catalyst amounts to a major advantage of the catalytic system of the invention, which translates in particular as notable advantages in terms of practicality, and operating cost of the methods using these catalysts.

Different aspects and advantages of the invention will become better apparent from the example of embodiment given as an illustration below.

EXAMPLES

Two catalysts C1 and C2 according to the invention were prepared under the conditions defined in Examples 1 and 2 below, which were tested following the protocol described in Examples 3 and 4.

For the preparation of the catalysts C1 and C2, as substrate an olivine was used acquired from Magnolithe GmbH, having a particle size of 400-600 µm and previously calcined at 1,600° C. The elementary weight composition of the olivine used was the following:

| 30.5% Mg | 7.1% Fe | 19.6% Si |
| 0.20% Ca | 0.07% Al | 0.08% Cr. |

Example 1

Preparation of Catalyst C1 (10% Fe/Olivine)

Impregnation of the Support 20 g of the above-mentioned olivine was mixed with 20 millilitres of an aqueous solution of ferric nitrate $Fe(NO_3)_3, 9H_2O$ having a concentration of 2.1 mol/litre.

drying

Water was evaporated in a rotary evaporator at atmospheric pressure and heating by means of an oil bath at a temperature of 120° C. for 2h, after which the mixture was dried for 15 hours (overnight) at 100° C.

Heat Treatment

The material derived from the previous drying step was heat treated in air for 4 hours at a temperature of 1,000° C.

Example 2

Preparation of Catalyst C2 (20% Fe/Olivine)

This was conducted under the same conditions as for catalyst C1 with the difference that the impregnation of the substrate was carried out using a more concentrated aqueous solution of ferric nitrate $Fe(NO_3)_3 9H_2O$, namely having a concentration of 5 mol/liter.

The catalysts C1 and C2 thus prepared were used as such (without any prior pre-reducing) to carry out a catalytic steam reforming reaction of two types of tars namely toluene and 1-methylnaphtalene, which are representative of the tars formed in steam gasification processes of biomass.

Example 3

Steam Reforming of Toluene

Example 3.1

The catalysts C1 and C2 were used for treating a gaseous medium at 825° C., having a composition by volume of:
12% $H_2O$;
22.3% $H_2$;
20% de $N_2$; and
45% Ar
and comprising toluene at a concentration of 30 g/Nm³ (which corresponds to the upper range of typical tar contents obtained during biomass gasification processes).

To carry out the steam reforming of toluene, steam was added to the gaseous medium at a concentration which corresponds to the stoechiometric quantity for performing the following theoretical conversion reactions:

$C_7H_8$(toluene)+14 $H_2O \rightarrow$ 18 $H_2$+7$CO_2$ $C_{11}H_{10}$(1-methylnaphtalene)+22$H_2O \rightarrow$27$H_2$+11$CO_2$ The hydrogen present in the medium has a molar ratio $H_2/H_2O$ of 1.5:1.

The gaseous mixture thus prepared was then contacted with 400 mg of catalyst (C1 or C2, respectively), at 825° C., in a bed reactor.

XRD, Mössbauer spectroscopy and TPR analyses indicated that, under these conditions, the catalyst at all times comprises an olivine structural base and that the iron (III) present in particular on the surface disappears to a large extent to the benefit of the onset of a metallic iron phase) (Fe⁰). For catalyst C1, the iron that is present is essentially distributed as metal iron (for more than 40%) and iron (II) is present partly in the olivine structure (for more than 25%) and for the other part in the form of oxides (for more than 15%). For catalyst C2, the distribution of iron is the following: more than 55% as metal iron, more than 14% as iron (II) in the olivine structure and more than 14% as iron (II) in the form of iron oxide. The remainder is in iron (III) form.

With catalyst C1 (10% Fe/olivine), a conversion rate of 90% was obtained for toluene, and a hydrogen yield of 60%. This rate of conversion and this yield proved to be stable over time throughout the entire test time of 30 h.

With catalyst C2 (20% Fe/olivine), the conversion rate of toluene obtained was even higher, namely 95% with a hydrogen yield of the order of 60%, this rate of conversion and this yield also being stable over the 30 h duration of the test conducted.

For the purposes of comparison, the gas mixture was treated with olivine alone, again under the same conditions. The toluene conversion rate obtained under these conditions was 31% and the hydrogen yield was 30%, which is largely below the values obtained with catalysts C1 and C2.

It is to be noted that the results obtained with the catalyst C1 in terms of conversion and yield are identical to those obtained, under the same conditions, with the Ni/olivine catalyst exemplified in application FR 2809030, which contains 3.9% Nickel on olivine.

Example 3.2

The catalysts C1 and C2 were also used at the same temperature to treat a gas mixture similar to the mixture derived from gasification of biomass in a fluidized bed, whose volume composition of the dry gas was the following: 35% hydrogen, 35% carbon monoxide, 17% carbon dioxide, 10% methane, 3% toluene (i.e. 30 g/Nm3, which corresponds to the upper range of typical tar contents obtained during biomass gasification processes).

Steam was added to this medium in a quantity corresponding to the stoechiometric quantity of the above-mentioned reactions (25% by volume in the gas flow, i.e. 14 moles of water per mole of toluene) to carry out the conversion reaction of toluene to $CO_2$ and $H_2$).

With the catalyst C1 (10% Fe/olivine), a gas mixture was obtained whose composition by volume on leaving the reactor (dry base) was the following: 46 hydrogen, 28% carbon monoxide, 18% carbon dioxide, 10% methane. This corresponds to a conversion of toluene of at least 95%. The conversion of toluene and the composition of the gas were shown to be stable over time during the entire duration of the 30 h test that was performed.

Example 4

Steam reforming of 1-methylnaphtalene

Example 4.1

The catalyst C1 was used to treat a gas mixture, at 825° C., having a composition by volume of 36% $H_2O$, 20% $N_2$ and 43% Ar and comprising 1-methylnaphtalene at a concentration of 30 g/Nm³ (1% by volume) which corresponds to the upper range of typical tar contents obtained during biomass gasification processes.

To carry out steam reforming, steam was added to the gas mixture at a concentration which corresponds to 3 times the stoechiometric quantity i.e. 66 moles of water per mole of 1-methylnaphtalene The gas mixture thus prepared was then contacted with 400 mg of catalyst C1 at 825° C. in a fixed bed reactor under atmospheric pressure and with a gas flow rate at the input of the reactor of 3NL/h.

XRD, Mossbauer spectrosopcy and TPR analyses indicated that, under these conditions, the olivine structure was maintained. In the presence of only water, the iron present on the catalyst is distributed in the form of $Fe_3O_4$ (for more than 62%), FeO (for more than 13%) and iron (II) of the olivine structure (for more than 21%)

Under these conditions, with catalyst C1 a conversion rate of 1-methylnaphtalene of 40% was obtained together with a hydrogen yield of 25%. This rate of conversion and this yield displayed stability over the entire duration of the testing time of 8h.

Example 4.2

The catalyst C2 was used to treat a gas mixture at 825° C. having a volume composition of 12% $H_2O$, 20% $N_2$ and 68% Ar comprising 1-methylnaphtalene at a concentration of 30 g/Nm³, and steam at a concentration corresponding to the stoechiometric quantity, under the same conditions of temperature, pressure and flow rate as in Example 4.1.

The catalyst C2 thus allowed a conversion rate of 25% to be obtained for 1-methylnaphtalene, and a hydrogen yield of 15%. This conversion rate and this yield displayed stability over time during the entire duration of the 8h test.

What is claimed is:

1. A catalyst comprising an olivine-based substrate the surface of which comprising a layer containing an iron compound, wherein said layer is obtained by impregnating the olivine substrate with a solution comprising an iron salt, followed by heat treatment of the impregnated substrate, at a temperature of between 400 and 1,400° C., and
    wherein said catalyst comprises at least 5% Fe(III) by weight relative to the total weight of the catalyst.

2. The catalyst according to claim 1, wherein the heat treatment is carried out in air.

3. The catalyst according to claim 1, wherein the olivine meets the formula $(Mg_{1-x}Fe_x)_2SiO_4$ in which x is a nonzero number and lower than 1.

4. The catalyst according to claim 3, wherein x is between 0.01 and 0.5.

5. The catalyst according to claim 1, wherein the olivine in the olivine-based substrate comprises in weight relative to the total weight of the olivine:
    between 28% and 35% Mg;
    between 1% and 10% Fe;
    between 18% and 22% Si;
    optionally up to 0.5% Ni;
    optionally up to 0.5% Ca;
    optionally up to 0.5% Al; and
    optionally up to 0.5% Cr.

6. The catalyst according to claim 1, wherein the olivine-based substrate is in a form of a powder having a mean particle size of between 100 μm and 750 μm.

7. The catalyst according to claim 1, wherein said catalyst comprises from 10 to 20% Fe(III) by weight relative to the total weight of the catalyst.

8. A method for preparing a catalyst according to claim 1, comprising the following successive steps:

(A) impregnating an olivine-based substrate with a solution comprising an iron salt;
(B) drying the impregnated solid obtained after step (A); and
(C) heat treating the dried solid obtained after step (B) by leaving this dried solid at a temperature of between 400 and 1,400° C.

9. The method according to claim 8, wherein the solution used at step (A) is an aqueous solution.

10. The method according to claim 8, wherein the iron salt used at step (A) is a ferric nitrate $Fe(NO_3)_3$.

11. The method according to claim 8, wherein the heat treatment at step (C) is conducted leaving the dried solid derived from step (B) at a temperature of 600 to 1,400° C.

12. The method according to claim 8, wherein the heat treatment at step (C) is conducted leaving the dried solid obtained after step (B) at a temperature of 600 to 1,400° C. for a time of 2 to 10 hours.

13. A method for steam reforming tars present in a gaseous medium, wherein the method comprises contacting the tars with a catalyst according to claim 1 in the presence of steam.

14. A method for steam reforming tars present in a gaseous medium, wherein the method comprises contacting the tars with a catalyst according to claim 1 in the presence of steam in the presence of hydrogen.

15. The steam reforming method according to claim 13, wherein the catalyst is contacted with the tars in the presence of steam and hydrogen, with a molar ratio $H_2/H_2O$ of more than 1:1 and less than 2:1.

16. The steam reforming method according to claim 13, wherein the gaseous medium containing the tars is obtained by steam gasification of organic compounds.

17. The steam reforming method according to claim 16, wherein the organic compounds are derived from biomass.

18. A method for steam gasifying an organic compound derived from biomass, wherein the method comprises contacting the organic compound, steam and a catalyst according to claim 1 in a form of a fluidized bed.

19. A catalyst comprising an olivine-based substrate wherein said catalyst comprises at least 5% by weight of an iron compound relative to the total weight of the catalyst, and wherein said catalyst has a specific surface area greater than 1 $m^2/g$.

20. The catalyst according to claim 19, wherein the olivine meets the formula $(Mg_{1-x}Fe_x)_2SiO_4$ wherein x is a nonzero number and lower than 1.

21. The catalyst according to claim 19, wherein x is between 0.01 and 0.5.

22. The catalyst according to claim 19, wherein the olivine in the olivine-based substrate comprises in weight relative to the total weight of the olivine:
between 28% and 35% Mg;
between 1% and 10% Fe;
between 18% and 22% Si;
optionally up to 0.5% Ni;
optionally up to 0.5% Ca;
optionally up to 0.5% Al; and
optionally up to 0.5% Cr.

23. The catalyst according to claim 19, wherein the olivine-based substrate is in a form of a powder having a mean particle size of between 100 μm and 750 μm.

24. The catalyst according to claim 19, wherein said catalyst comprises from 10 to 20% Fe(III) by weight relative to the total weight of the catalyst.

25. The catalyst according to claim 19, wherein said catalyst comprises at least 10% Fe(III) by weight relative to the total weight of the catalyst.

26. The catalyst according to claim 19, wherein said catalyst comprises at least 15.3% Fe(III) by weight relative to the total weight of the catalyst.

27. The catalyst according to claim 19, wherein said catalyst comprises at least 20% Fe(III) by weight relative to the total weight of the catalyst.

28. The catalyst according to claim 1, wherein said catalyst comprises at least 10% Fe(III) by weight relative to the total weight of the catalyst.

29. The catalyst according to claim 1, wherein said catalyst comprises at least 15.3% Fe(III) by weight relative to the total weight of the catalyst.

30. The catalyst according to claim 1, wherein said catalyst comprises at least 20% Fe(III) by weight relative to the total weight of the catalyst.

* * * * *